United States Patent
Richards et al.

(10) Patent No.: US 12,512,005 B1
(45) Date of Patent: Dec. 30, 2025

(54) DEVICE, SYSTEM AND METHOD FOR EMERGENCY LANDING SITE IDENTIFICATION, SELECTION, ROUTING, AND CONFIRMATION

(71) Applicants: Barron Associates, Inc., Charlottesville, VA (US); Loyd Hook, Tulsa, OK (US)

(72) Inventors: Nathan Douglas Richards, Durham, NC (US); Alec JacobDevine Bateman, Charlottesville, VA (US); Loyd Hook, Tulsa, OK (US)

(73) Assignee: Barron Associates, Inc., Charlottesville, VA (US)

( * ) Notice: Subject to any disclaimer, the term of this patent is extended or adjusted under 35 U.S.C. 154(b) by 23 days.

(21) Appl. No.: 18/924,294

(22) Filed: Oct. 23, 2024

(51) Int. Cl.
| | |
|---|---|
| G08G 5/30 | (2025.01) |
| G01S 17/89 | (2020.01) |
| G06F 16/29 | (2019.01) |
| G08G 5/21 | (2025.01) |
| G08G 5/54 | (2025.01) |
| G08G 5/55 | (2025.01) |
| G08G 5/58 | (2025.01) |

(52) U.S. Cl.
CPC .............. G08G 5/55 (2025.01); G01S 17/89 (2013.01); G06F 16/29 (2019.01); G08G 5/21 (2025.01); G08G 5/54 (2025.01); G08G 5/58 (2025.01)

(58) Field of Classification Search
CPC .... G08G 5/0056; G08G 5/0021; G08G 5/025; G01S 17/89; G06F 16/29
See application file for complete search history.

(56) References Cited

U.S. PATENT DOCUMENTS

| | | | |
|---|---|---|---|
| 9,520,066 B2 * | 12/2016 | Spinelli | G08G 5/55 |
| 11,482,117 B2 * | 10/2022 | Sachs | G06Q 50/40 |
| 2003/0060940 A1 * | 3/2003 | Humbard | G01C 23/00 |
| | | | 701/3 |
| 2008/0154447 A1 * | 6/2008 | Spinelli | G05D 1/105 |
| | | | 701/16 |

(Continued)

FOREIGN PATENT DOCUMENTS

| | | | | |
|---|---|---|---|---|
| KR | 102501747 B1 * | 2/2023 | | |
| WO | WO-2023142638 A1 * | 8/2023 | | G01C 21/20 |

*Primary Examiner* — Peter D Nolan
*Assistant Examiner* — Demetra R Smith-Stewart
(74) *Attorney, Agent, or Firm* — Williams Mullen; Thomas F. Bergert

(57) ABSTRACT

Embodiments of the present disclosure provide a system, device and method for emergency landing assistance that leverages intelligent planning along with existing and acquired information to maximize the likelihood of locating and confirming a safe emergency landing site for an aircraft. Embodiments can determine candidate landing sites based upon input from one or more GIS data sources, airport data sources and sensor data. Embodiments can include a candidate landing site identification component, a candidate site evaluation component, a candidate site selection component, a route planning component and/or a real-time site assessment component. Determining a preferred route can be based on the total risk and/or suitability assessment for one or more candidate landing sites. In various embodiments, notifications such as recommended courses of action can be issued based upon a suitability assessment.

24 Claims, 4 Drawing Sheets

(56) References Cited

U.S. PATENT DOCUMENTS

2014/0343765 A1* 11/2014 Suiter .................... G08G 5/003
　　　　　　　　　　　　　　　　　　　　　　　701/18
2022/0204180 A1*  6/2022 Sellmann ............. G01C 23/005

* cited by examiner

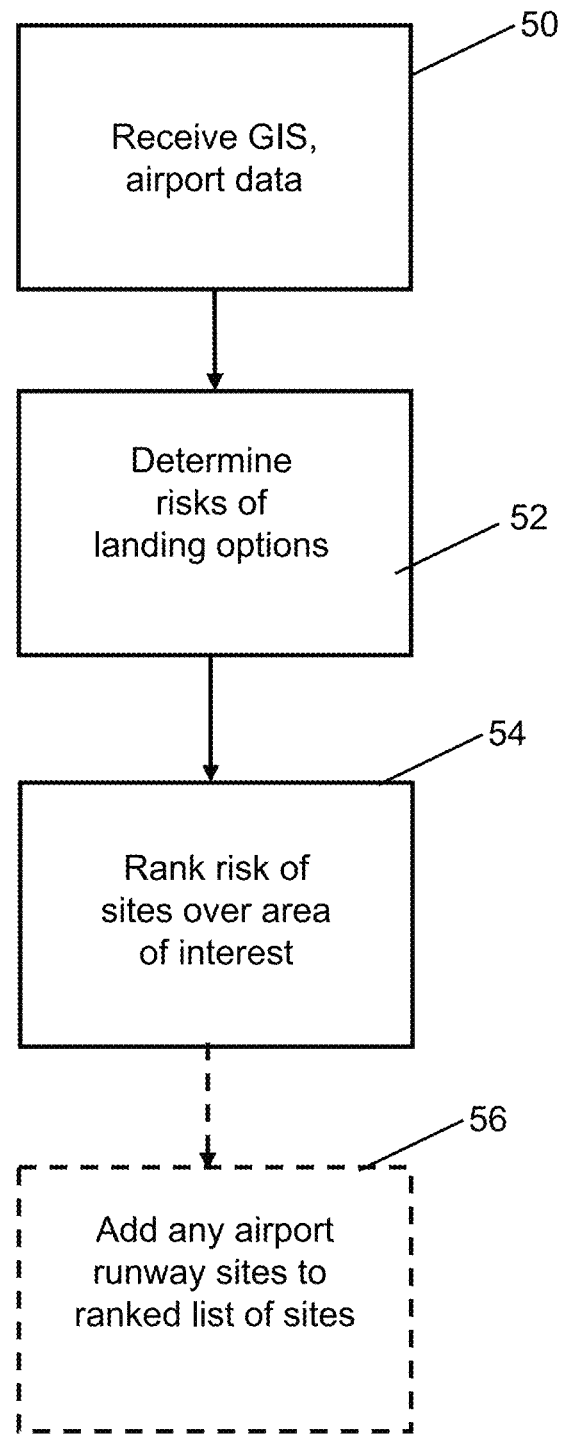

Fig. 3

| Landcover Category | Aircraft Damage Category | Risk to Aircraft and Occupants monetary [lives] |
|---|---|---|
| Unspecified | Substantial | $12,000,000 [4.0] |
| Open water | Substantial | $27,000,000 [9.0] |
| Perennial Ice Snow | None | $0 [0.0] |
| Developed Open Space | Minor | $600,000 [0.2] |
| Developed Low Intensity | Substantial | $12,000,000 [4.0] |
| Developed Medium Intensity | Substantial | $18,000,000 [6.0] |
| Developed High Intensity | Substantial | $24,000,000 [8.0] |
| Barron Rock | None | $0 [0.0] |
| Deciduous Forest | Substantial | $25,500,000 [8.5] |
| Evergreen Forest | Substantial | $25,500,000 [8.5] |
| Mixed Forest | Substantial | $25,500,000 [8.5] |
| Dwarf Shrub | Minor | $600,000 [0.2] |
| Shrub | Minor | $600,000 [0.2] |
| Grassland Herbaceous | None | $0 [0.0] |
| Sedge Herbaceous | None | $0 [0.0] |
| Lichens | None | $0 [0.0] |
| Moss | None | $0 [0.0] |
| Pasture Hay | None | $0 [0.0] |
| Crops | None | $0 [0.0] |
| Woody Wetlands | Substantial | $21,000,000 [7.0] |
| Emergent Herbaceous Wetlands | Minor | $600,000 [0.2] |

60

DEVICE, SYSTEM AND METHOD FOR EMERGENCY LANDING SITE IDENTIFICATION, SELECTION, ROUTING, AND CONFIRMATION

STATEMENT

This invention was made with government support under 80NSSC21C0130 awarded by National Aeronautics and Space Administration (NASA). The government has certain rights in the invention.

TECHNICAL FIELD

The present application pertains to aviation, and more particularly to systems, devices and methods facilitating actions associated with emergency landing scenarios.

BACKGROUND AND SUMMARY

Locating, evaluating and selecting emergency landing sites for aircraft is a critical task. The safety of aircraft crew and passengers and corresponding protection of people and property on the ground is of paramount importance and emergency situations for aircraft can arise spontaneously requiring quick decisions about where to attempt to land the aircraft involved.

Embodiments of the present disclosure provide a system, device and method for emergency landing assistance that leverages intelligent planning along with existing and acquired information to maximize the likelihood of locating and confirming a safe emergency landing site for aircraft. Candidate landing sites can be identified using existing data such as geographical information, LiDAR, and an airport database, for example. Embodiments as disclosed herein provide for routing between candidate sites in the event of a required emergency landing, assessment of the actual current suitability of the candidate sites, and selection of a safe emergency site for aircraft landing. Candidate landing sites can include non-airport landing sites and one or more airport runway sites, for example. In various embodiments, airport runway sites may not be available within the geographic map segment where an in-flight aircraft is located and thus only non-airport landing sites (i.e., non-airport sites) are considered as candidate landing sites. Embodiments as described herein can be fully autonomous, provided as assistance to a human pilot/operator, or any combination thereof. Embodiments as described herein can be implemented on any size vehicle and can be integrated with on-board avionics or on a portable computing device such as a tablet computer, for example. The presently disclosed embodiments can be used on crewed and uncrewed vehicles. While the landing suitability assessment according to the present disclosure can be accomplished via human observation, assessments as disclosed herein provide topographic methods (LiDAR, photogrammetry, etc.) and the use of a variety of applicable sensors in assessments.

BRIEF DESCRIPTION OF THE DRAWINGS

FIG. 2 is an exemplary flow diagram illustrating aspects according to the present disclosure.

FIG. 3 is a diagram showing risk and cost associated with landcover according to various embodiments of the present disclosure.

DETAILED DESCRIPTION OF EMBODIMENTS

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements.

Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

It will be appreciated that reference to "a", "an" or other indefinite article in the present disclosure encompasses one or more than one of the described element. Thus, for example, reference to a landing site may encompass one or more landing sites, a component may encompass one or more components and so forth.

Embodiments described herein are specifically configured to provide a technical solution to a particular problem utilizing an unconventional combination of steps/operations to carry out aspects of the present disclosure. In particular, embodiments herein implement a unique combination of steps to provide a novel approach to assessing suitable emergency landing areas for in-flight aircraft, including embodiments with autonomous support, recommended course(s) of action and user interface improvements.

Figure 1:
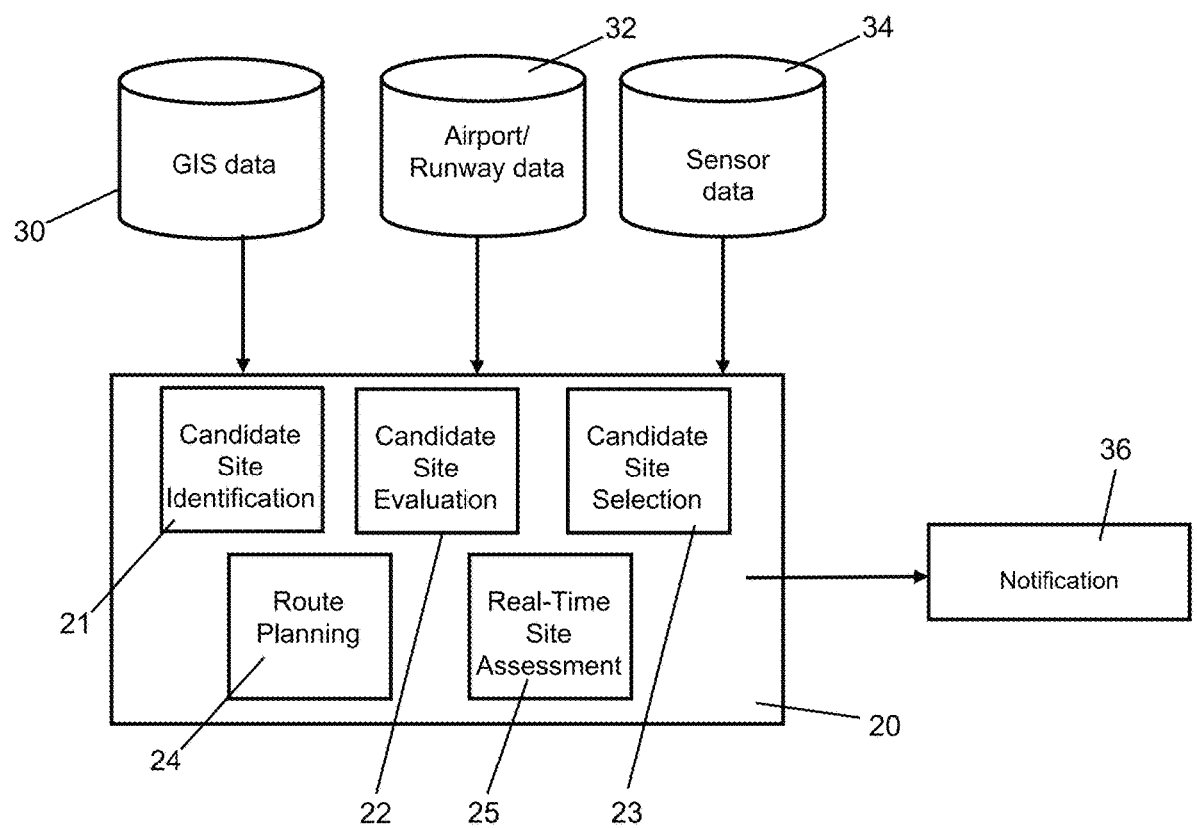
FIG. 1 is a schematic diagram illustrating a system in accordance with embodiments of the present disclosure.

FIG. 1 is a schematic diagram illustrating a system in accordance with embodiments of the present disclosure. As shown therein, a system 20, which may be a device and/or server, for example, can query and/or receive input from geographic information system (GIS) data source(s) 30, airport data source(s) 32 and sensor data 34. A query of these sources may be in response to system 20 receiving a request from an in-flight aircraft in need of emergency landing locations and/or assessments, for example. In various embodiments, the system 20 may receive input from these sources automatically and/or at regular intervals such that the system 20 need not make active requests for the information provided by these sources. Further, some of the information sources may include information known prior to an aircraft's departure and some of the information sources may include information only available during flight, such as real-time or near real-time information obtained while an aircraft is in flight. For purposes of the present disclosure, the term "real-time" will be understood to mean a variety of forms of close contemporaneity, including at exactly the same time, at nearly the same time, in parallel with, current time, at essentially the same time, at substantially the same time, and at more or less the same time, for example.

Embodiments of the system 20 can include a candidate landing site identification component 21, a candidate site evaluation component 22, a candidate site selection component 23, a route planning component 24 and/or a real-time site assessment component 25, for example. The candidate landing site identification component 21 is operable to use the inputs and/or information described herein to locate potential landing sites. The candidate site evaluation component 22 is operable to use the inputs and/or information described herein to evaluate the located/identified sites from candidate landing site identification component 21 and determine those sites that minimize the risk to people and property on the ground as well as the risk to the vehicle/aircraft, passengers and cargo if a landing were to be attempted at that site. The candidate site selection component 23 is operable to use the inputs and outputs from other components to determine the most preferred site and/or a ranking of sites for emergency landing. The route planning component 24 is operable to plan multi-objective routes that balance the utility of acquiring new knowledge (e.g., an updated, current and/or real-time site assessment) while minimizing required range and remaining within range of the currently anticipated optimal and/or most preferred site. The route planning component 24 can operate as an intelligent agent in various embodiments, providing multi-objective decision making based on existing on-board knowledge and incoming acquired knowledge (i.e., perception). In various embodiments, the route planning component 24 functions continuously, re-evaluating routes as time passes and the in-flight aircraft changes location, even during normal operations, to ensure that emergency landing plans, including precautionary and forced landing plans, are available at all times.

Embodiments of the real-time site assessment component 25 leverage on-board perception to update site assessments based on the currently observed site suitability. The real-time site assessment component 25 can also provide the newly acquired knowledge to the route planning component 24. Once a site has been assessed in real-time by the real-time site assessment component 25, the certainty associated with that assessment is increased. Across the various embodiments described herein, if minimum criteria are met such as one or more threshold assessment levels being met or exceeded (or not exceeded such as by being below a risk threshold, for example), a notification 36 can be issued and a landing at the selected site can be initiated. In various embodiments, the real-time site assessment component 25 is sensor-based and employs input from LiDAR, photogrammetry, and/or other sensor sources 34. In additional embodiments, the real-time assessment component 25 can include non-sensor-based input, such as may be obtained from human visual input, whether from onboard an aircraft or external to the aircraft. A notification or alert issued according to the present disclosure can include, without limitation, a notification to a computing device such as a device onboard an aircraft, an audible command sent to a computing device such as a device onboard an aircraft, a haptic activation message sent to a device such as a device onboard an aircraft that can generate a haptic output such as may trigger a further action by the recipient of the output, a notification to air traffic control personnel, a notification to emergency assistance personnel in the geographic area surrounding the selected landing site, one or more recommended courses of action and other types of notifications. In various embodiments, the notification and/or recommended course of action can be provided as an update or overlay on a map displayed on a user interface, such as a graphical user interface on a portable computing device, for example. Such update or overlay can show one or more selected and/or preferred routes. Such an update may also show routes with one or more relative risks and/or relative suitability assessments shown on the display. The relative risks and/or suitability assessments can be shown as color-coded or quantified, for example. It will be appreciated that a map display with relative risks and/or suitability assessments of different candidate landing sites provides a technically improved and convenient approach to facilitate actions associated with emergency landing scenarios, wherein personnel involved are under extremely stressful conditions.

FIG. 2 is an exemplary flow diagram illustrating embodiments of extracting candidate landing sites from existing GIS data according to the present disclosure. As at 50 in FIG. 2, GIS data is received, such as population data, landcover data, terrain elevation and slope data, highest nearby obstruction data, for example. As at 52, the risks associated with landing options are determined, which can include, for example, the ground-risk (risk to persons and property on the ground) and the on-board risk (risk to the aircraft, its occupants and potentially its cargo). In various embodiments, such risks can be estimated for each data map pixel location based on the population, landcover, obstructions, and terrain elevation at that location. According to various embodiments, a landing area template which can be the size of the required landing area, for example, is then applied to sum the cumulative risk of all pixels within that landing area template. This landing site risk then represents the suitability of the landing site, with lower risk/higher suitability being desirable. It will be appreciated that, as at 54, all landing sites over the area of interest can then be sorted from most to least suitable and trimmed by deleting the least suitable sites until the specified maximum and minimum landing site spacing requirements are met according to various embodiments of the present disclosure. If any sites are airport runways, as at 56, such airport runway sites can be directly added to the list of candidate emergency landing sites with a risk score of zero. It will be appreciated that airport runway site inclusion can be an optional feature and is therefore shown in dashed lines in FIG. 2.

Although many types of GIS data can be used to locate candidate landing sites, embodiments of the present disclosure include population, landcover, terrain elevation & slope, and highest nearby obstruction. In various embodiments, the highest nearby obstruction data can be estimated using preexisting LiDAR data. Each map, which may be a two-dimensional map, for example, can be sourced from pre-existing information such as population counts, land use surveys and terrain elevation maps, for example, computed from existing data such as LiDAR databases or generated for a specific purpose such as by defining a custom high-risk area, for example. In one instance, each data source is resampled to a fifteen-by-fifteen square meter pixel resolution raster map to align all risk sources into the same resolution.

The GIS data sources can then be used to determine the risk imposed upon persons and property on the ground at all locations, wherein the risk can be discretized into individual map data cells should a landing be attempted at that particular location. It will be appreciated that high population count and developed areas are, for example, considered to be high cost and risk areas. According to various embodiments of the present disclosure, the risk is assumed to be the product of the cost of the damage multiplied by the probability that the damage would occur should an aircraft impact the ground at the location associated with the pixel. In embodiments, in the case of on-ground risk, it is assumed that the probability is 1.0 (i.e., the damage will occur if a landing is attempted here) and therefore risk is equal to cost and is expressed in the same units. In various embodiments, the risk units are unified into an equivalent number of "human lives", with three million dollars employed as being equivalent to one life, for example. In such embodiments, each population count (i.e., each individual person on the ground) corresponds to one unit of risk. In addition to human lives lost on the ground, the cost of any damage incurred upon the ground can also be converted to an equivalent number of human lives. In various embodiments, landcover types can be assigned a cost on a per pixel basis. By way of example, these landcover types can be assigned values of "developed open space"=(0.003), "developed low intensity"=(0.167), "developed medium intensity"=(0.3), "developed high intensity"=(1.0), "paster hay"=(0.003), and "crops"=(0.003) with other types, such as "open water" and "shrub", assumed to incur no additional on-ground cost. It will be appreciated that the values assigned to each type are user adjustable. In the case of on-ground risk, there is no upper limit on the risk level of each pixel according to various embodiments of the present disclosure. In contrast, in the case of on-aircraft risk, each on-aircraft risk pixel can be limited to an upper value equivalent to the value of the aircraft plus an estimated number of people on-board the aircraft. In various embodiments, this maximum value is one aircraft (equivalent in monetary value to 1.0 life) plus eight people on board. This 9.0 value represents a total loss of aircraft and lives and no more damage can occur on-board in this example.

In various embodiments, the GIS data sources can also be used to determine the risk imposed upon the aircraft itself as well as its inhabitants, with forested areas and steep terrain slopes, for example, considered to be high risk areas. In the case of on-aircraft risk, the total cost can be determined by the value of the aircraft and the people on board while the probability of incurring that cost varies with terrain slope and landcover type. In various embodiments, each pixel is limited to a total on-aircraft risk of 9.0 which represents a total loss of aircraft (1.0) plus 8.0 lives on-board, as exemplified above. According to various embodiments, the key contributors to aircraft risk are landcover, terrain slope, and obstruction height. Terrain slope can be estimated using a local planar fit of the available terrain elevation data, wherein the incurred risk increases with an increase in terrain slope. In various embodiments, terrain slope of less than five degrees is considered 0.0 risk, terrain slope from five to 12.5 degrees is assumed to incur a risk of 0.2, terrain slope from 12.5 to 20.0 degrees is assumed to incur a risk of 4.5, and slope values of 20.0 degrees and above are assumed to incur 9.0 risk (total loss). Several landcover types contribute to on-aircraft risk due to the probability that than landcover type will cause on-board damage and injury should a landing be attempted in that landcover class. As described herein, the risk can be determined as the product of the cost and probability, and each landcover type can be assigned a probability of damage which, together with the maximum cost, yields the on-board risk associated with each pixel of that landcover type.

FIG. 3 is a diagram 60 showing risk and cost associated with landcover expressed in both US dollars and number of lives according to various embodiments of the present disclosure.

In various embodiments, the additional on-board risk due to obstructions as estimated from preexisting LiDAR data can be based on the highest obstruction height in each data map pixel. The LiDAR data can also be used to estimate a local ground plane and outliers from the plane are considered obstructions. The highest obstruction in each pixel area is then stored. According to various embodiments, the additional risk value depends on the estimated obstruction height. In embodiments, pixel cells with obstructions of less than one foot are assigned zero additional risk, pixel cells with obstructions of two feet or larger are assigned an additional risk of 9.0, and pixel cells with obstruction from one to two feet are assigned a risk from zero (at 1.0 feet) to 9.0 (at 2.0 feet) determined as a linear increase from 1.0 feet to 2.0 feet.

In various embodiments, the resulting risk maps, which may include two-dimensional maps, for example, can then be separated into two groups based on whether that pixel incurs risk on the ground or on-board the aircraft. The data maps associated with each group (ground or on-board) can then be combined to yield two (onboard and on-ground) pixel-based risk maps. On-ground risk maps can be combined by superposition (unlimited) and on-board risk maps can be combined by superposition but limited to a maximum total per-pixel risk based on the cost of a complete loss of aircraft and people on board, for example.

According to various embodiments, the cumulative risk for landing footprint areas can then be determined by summation of all individual map data cells within the boundary of a landing footprint area, which can be considered to be the length and width needed for a safe landing of a particular vehicle, using both the ground and on-board risk data maps. For each landing footprint area, the total on-ground risk can be determined by summation of all pixel cells within that landing footprint area and the total on-board risk can be determined by summation of all pixel cells within that landing area. However, in the on-board case, there can be a maximum risk limitation associated with a total loss of aircraft and people on-board. The total landing area risk is then the sum of the on-board and on-ground risk. In various embodiments, the full area of interest can be sampled with a very high number (e.g., tens of thousands) of randomly placed landing footprint area templates according to location and heading, resulting in a very large number of sites over the area of interest and, associated with each site, an estimate of the on-ground risk, on-board risk, and total risk.

Once the total risk of the set of sampled sites has been determined, the set of risks can be sorted and trimmed to return the lowest risk (i.e., most suitable) sites while meeting the specified minimum and maximum spacing requirements according to embodiments as disclosed herein. Employing minimum spacing requirements ensures that there are not too many candidates sites in one area. For example, a single open field could contain hundreds of sites at different headings and slightly different locations within the same field. Employing maximum spacing requirements ensures that there is always a candidate site within a specified distance from any location in the area of interest (i.e., always a site within a specified distance of the aircraft). In embodiments such as may be employed for a single engine piston fixed wing aircraft, the minimum spacing distance is set to one mile while the maximum is set to fifteen miles. In various embodiments, the minimum spacing can be reduced up to one half of the specified minimum in the case of highly desirable sites, which ultimately reduces the need to accept less desirable sites to meet the maximum separation requirement.

In various embodiments, to reduce a potentially large initial set of candidate sites, which may be considered as the "unexplored set", the set is first ordered from lowest risk to highest risk. The lowest risk site is then added to the list of selected sites, which may be considered as the "saved set", and each site within the minimum spacing distance of this site is deleted from the unexplored set. The next lowest risk site from the unexplored set is then moved to the saved set and, again, any sites within the minimum spacing distance of this newly saved site is deleted from the unexplored set. As mentioned elsewhere herein, reduced spacing such as one half the specified minimum spacing is optionally enabled for sites with a very low risk level, such as a risk level of 1.0, for example. In this case, if a site with a risk level of less than the specified threshold is moved to the saved set, only sites within a radius of one-half of the specified minimum separation are deleted from the unexplored set, in contrast to removing sites within a radius equal to the specified minimum. This process can be repeated until no sites remain on the unexplored set. The resulting saved set can then be retained as the final set of identified candidate landing sites. The final set can then be written to an output file and/or communicated to a device such as a device on-board an aircraft, for example. This catalog database of candidate sites can be stored on board the system and, in flight, this database can be queried for nearby potential landing sites, for example. Further, one or more notifications or alerts can be issued in various embodiments as described elsewhere herein.

When determining an emergency landing plan, embodiments of the present disclosure can first query the set of candidate sites and return a set of nearby sites to be considered for an emergency landing. Many options exist for completing the site selection step which is responsible for determining which nearby sites are to be considered for planning and landing. Options include those that are closest to the vehicle, those that are along the current direction of travel, those that are best aligned with the winds, and those with the lowest risk, among other approaches. In embodiments, latitude and longitude bounds based on the current vehicle position can computed by system 20 and the lowest risk sites within those bounds are returned. In such embodiments, the top options can be returned from within a square with dimensions of approximately 70% or another selected percentage of the expected vehicle range centered on the current vehicle position, wherein the range can be considered to be the glide distance or specified precautionary landing range. In such example, if less than a certain number of options (e.g., five options) exist within that square, just the options available are returned. These landing site options can then be passed to the route planning component 24 to determine which sites to visit and in which order. In various embodiments, route planning is not required and the system can operate to issue a notification without route planning.

For path or route planning and for presentation to a pilot/operator according to embodiments of the present disclosure, each landing area risk can be converted to a risk area suitability score and/or suitability assessment. In various embodiments, the conversion can be completed according to the following equation: suitability assessment=−(10*risk level)+100, with a minimum value of 0.0. With this conversion equation, risk values of zero can be converted to a suitability assessment of 100.0 and risk values of ten or more can be converted to a suitability assessment of 0.0.

Once site selection is complete, the selected sites are provided to the route planning component 24 that can both prioritize which of the sites should be included in the plan and generate a path plan for visiting the sites. It will be appreciated that embodiments may operate whereby a pilot of an in-flight aircraft may visit all candidate landing sites in a path plan generated by the route planning component 24, a subset of the candidate landing sites in the path plan, or just one candidate landing site in the path plan prior to committing to a landing site in which to land. It will further be appreciated that embodiments may operate where the route planning component 24 generates a path plan including only one landing site, or awaits additional information and passage of time before generating a path plan. While the path planning process can be completed in a number of ways, embodiments of the present disclosure can employ a cost-constrained-traveling salesman (CCTS) approach. In such embodiments, the selected sites are provided to the CCTS solver along with an estimated remaining range. In the case of a forced landing, the elevation above ground and the vehicle glide ratio can be used to estimate the remaining range. In the case of a precautionary landing, the range can be a configuration parameter specified before flight (15, 30, or 45 nautical miles, in one instance). An included CCTS solver can then return an optimal route. In various embodiments, an optimal route is that which maximizes the cumulative suitability of all sites visited without exceeding the specified estimated range. In various embodiments, the CCTS solver applies a brute force approach by computing and comparing all possible options to find an optimal route.

For ease of visual presentation to the pilot/operator, each suitability can be assigned a color to be presented to the pilot/operator on a display, such as a display in the cockpit of the aircraft and/or on a portable computing device such as tablet or laptop computer, for example. In exemplary embodiments, suitability values of zero to 50.0 are presented as red, 50.1 to 70.0 are presented as orange, 70.1 to 95.0 are presented as yellow, and 95.1 and higher are presented as green.

As each site is visited and assessed via observation, which may include visual, LiDAR, RADAR, etc., its suitability rating is updated based on the current observed suitability, which can include real-time information from real-time site assessment component 25, for example. The observed suitability is then used to determine if a landing should be attempted at the current site or if another site should be visited and assessed via observation. Further, the updated assessment can then be stored for subsequent emergency planning. In the case of pilot/operator assessments, the pilot/operator can tap a colored box in a user interface according to various embodiments and an associated suitability score can then be stored for the current site. According to various embodiments, a red box represents an observed suitability assessment of zero, orange represents an observed suitability assessment of 50.0, yellow represents an observed suitability assessment of 70.0, and green represents an observed suitability assessment of 95.0. Suitability threshold values can be stored, and these values can be user specified and/or predetermined. For example, a minimum suitability threshold of 70.0 may be required in order for a candidate landing site to be considered as preferred and/or recommended. In various embodiments, a suitability assessment is a binary outcome that is above or below a pre-established suitability threshold.

Figure 4:
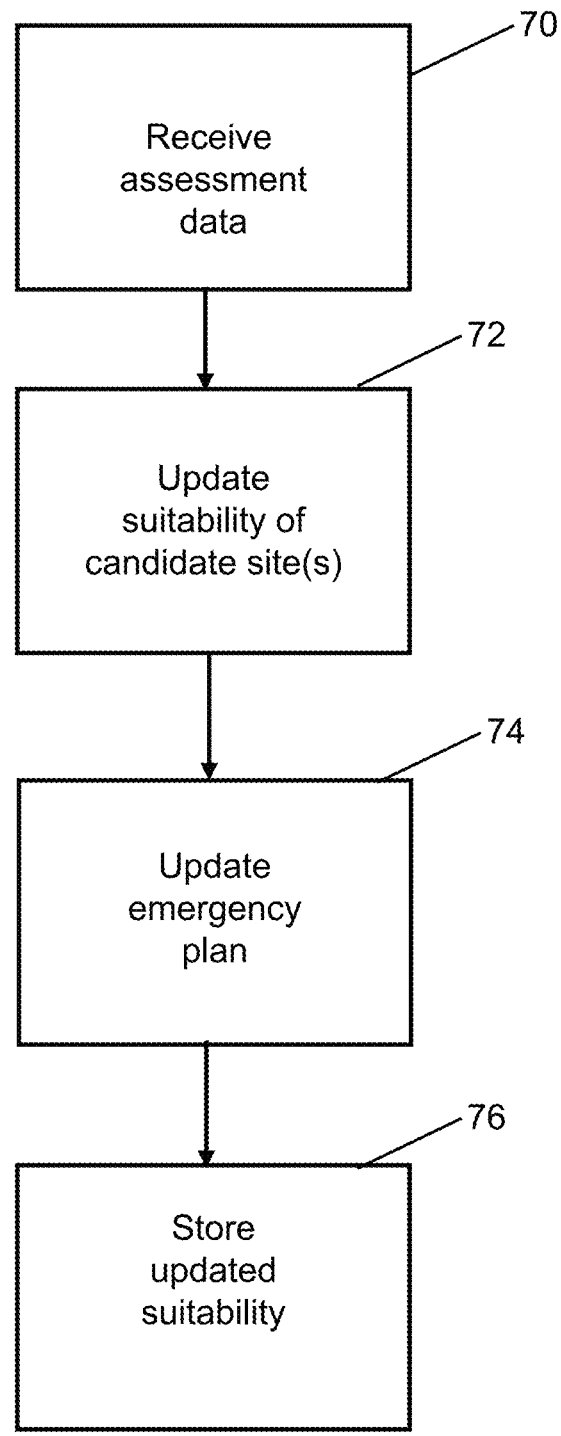
FIG. 4 is an exemplary flow diagram illustrating acquisition of updated and/or current site assessments according to embodiments of the present disclosure.

FIG. 4 is an exemplary flow diagram illustrating the acquisition of updated and/or current site assessments according to embodiments of the present disclosure. As at 70, assessment data is acquired and/or received via one or more sensors which can be, for example, LiDAR, photogrammetry, and/or RADAR sensors and/or via human visual assessment either directly (e.g., through an aircraft window) or via video feed. Such human visual assessment and/or video feed information can be considered as visually obtained data for purposes of the present disclosure. Considering that conditions may have changed since the candidate sites were identified via GIS data, these assessments determine the current suitability of a candidate site. These assessments reveal, for example, the presence of obstructions and/or human activity. These updated assessments are then used to update the suitability of the candidate site as at 72, which then informs the system and/or operator regarding the current emergency plan as at 74. As an example, a human operator can visually observe/assess the site and input the updated assessment to the system. As another example, LiDAR data can be used to estimate the slope of the underlaying terrain and to determine the presence of obstructions. In the case of LiDAR, a set of LiDAR point cloud data points can be used to determine a ground plane (i.e., terrain elevation and local slope) using linear regression and, subsequently, outliers from this estimated ground plane are assumed to represent obstructions with larger distances corresponding to lower suitability ratings.

Once the site is assessed via observation, a recommended course of action such as a land-here decision can be made based on the specified criteria. In the case of a human operator, the decision can be made by that operator. Embodiments of the present disclosure can apply two criteria to determine a land-here decision: (1) if the observed suitability is above a user specified threshold (e.g., involving a risk assessment lower than a user specified and/or predetermined risk threshold); and/or (2) if the observed suitability is higher than any of the remaining expected suitability ratings. Threshold values can be pre-determined based on a variety of factors and stored in a database for use by embodiments of the system, device and method of the present disclosure. For example, a threshold value for a mountainous location may be different from a threshold value for a flat plain area as the mountainous location may involve higher risk and lower suitability due to terrain type. As another example, a threshold value for an area with human presence on the ground may be different from a threshold value for an area with no human presence.

The above-described process can continue until a suitable site is found. If no site is above the desired suitability threshold, the site with the highest observed suitability becomes the recommended site according to various embodiments. According to various other embodiments and depending upon status of the aircraft experiencing an emergency, a recommended course of action can be to continue flight until a new candidate landing site or sites can be evaluated in a different geographic area or map segment. Such approaches may be most appropriate when an aircraft is in a precautionary landing scenario versus an immediate emergency scenario, for example. Further, such a new candidate landing site can be one that has been employed in the selected preferred route or one that was not employed in the selected preferred route, for example. Updated suitability assessments can be stored as at 76 in FIG. 4.

Various embodiments of the present disclosure can be integrated with one or each aircraft, leveraging a sensor attached to the aircraft, including an in-cockpit display, and performing autonomous emergency landing site selection. Such embodiments can be activated automatically by the aircraft in the event that an emergency landing is required. In such embodiments, a route can be planned to visit several candidate emergency sites such as may be autonomously chosen from an on-board database of sites, for example. As each site is visited, the sensor assesses and/or observed data is used to assess the site to determine its current suitability. This updated suitability is then used by the system to determine if the landing should be conducted at this site, if the next site should be visited, or if the emergency plan should be replanned and/or updated. The system can provide route information to an onboard guidance system, for example. It will be appreciated that such embodiments can be adapted such that the system and/or device is or is not integrated with the aircraft, does or does not include an attached sensor, does or does not include a display, and is or is not autonomous, for example.

Embodiments of the presently disclosed system are integrated with the aircraft, leverage a sensor attached to the aircraft, include an in-cockpit display, and support pilot execution of an emergency landing. In such embodiments, the system can be activated by the pilot and can be executed by the pilot either manually or through an existing autopilot/flight management system. In such embodiments, the system selects the candidate sites, plans the route, and as each site is visited, the sensor assesses the site to determine its current suitability. The updated suitability assessment is provided to the pilot. In various embodiments, the pilot ultimately decides on which site is to be used for the emergency landing and can request new plans as desired.

Embodiments of the presently disclosed system can be integrated with the aircraft, leveraging a sensor attached to the aircraft, not including an in-cockpit display, and performing autonomous emergency landing site selection. Such embodiments are well suited for uncrewed aircraft. In such embodiments, the system can plan a route to visit several candidate emergency sites and as each site is visited, the sensor can assess the site to determine its current suitability. The updated suitability can then be used by the system to determine if the landing should be conducted at this site, if the next site should be visited, or if the emergency plan should be replanned and/or updated.

Embodiments of the present system include embodiments where the system is not integrated with the aircraft, where an in-cockpit (e.g., portable computer based) display is provided, and wherein a sensor is attached to the aircraft. In such embodiments, the system selects the candidate sites, plans the route, and as each site is visited, the sensor assesses the site to determine its current suitability. The updated suitability can be provided to the pilot via the in-cockpit display, for example. The display can include color-coded options and/or numerical options, where the color coding and/or numerical options represent suitability assessments as described elsewhere herein. The pilot can ultimately decide on which site is to be used for the emergency landing and can request new plans as desired. In this embodiment, the sensor can communicate with the in-cockpit display over a wireless or wired connection, for example.

Embodiments of the present system can be integrated with the aircraft, wherein the aircraft includes an in-cockpit display and a sensor is not attached to the aircraft. In such embodiments, the pilot visually assesses (e.g., through the window or over video display) the candidate sites as they are visited and provides these assessments to the system through the display. Such embodiments can be executed by the pilot either manually or through the existing autopilot/flight management system on the aircraft. The pilot can either choose the desired site or accept the site recommended by the system, for example.

Embodiments of the present system may not be integrated with the aircraft, but may include an in-cockpit (e.g., portable computer-based) display, wherein a sensor is not attached to the aircraft, and wherein the system does not operate autonomously. In such embodiments, the system can be activated by the pilot and can be executed by the pilot either manually or through the existing autopilot/flight management system. In such embodiments, the system selects the candidate sites, plans the route, and as each site is visited, the pilot visually assesses the candidate site. The system presents the site and route information to the pilot and the pilot ultimately selects the desired landing site. In such embodiments, the system can also make a recommendation.

Embodiments of the present system include a remote operator, or team of operators, that can interact with the system and the remote operator(s) may be operating with multiple instances of the system on multiple vehicles, for example. The remote operator(s) may be stationary on the ground (fixed base), in a ground vehicle, in an air vehicle, in a marine/submarine vehicle, or in a space vehicle, for example.

Additional embodiments of the present disclosure include various levels of human interaction including fully autonomous (no pilot/operator, human out of the loop) to a level at which the emergency landing guidance is presented to the pilot/operator and the pilot/operator is responsible for following the suggested route and, possibly, selecting the desired landing site (i.e., the pilot is in the loop). Various intermediate levels of operation according to the present disclosure include autonomous tactical decision making while the human maintains overall control with a medium level of interaction with the system (i.e., human on the loop) and human supervision with minimal, and/or optional, interaction (i.e., human over the loop).

Embodiments of the candidate site identification according to the present disclosure include sites being identified in real-time (instead of prior to flight). Additional embodiments of the site identification component according to the present disclosure include site generation occurring on the ground, onboard, or onboard a separate vehicle.

Other embodiments of the presently disclosed system leverage data gathered in-flight in order to identify candidate sites. Data collection can include sensor-based collection and/or collection from a cooperating system such as ADS-B, wi-fi, and/or cellular. Such embodiments can include the use of additional image processing techniques and artificial intelligence to analyze the collected data for landcover, population data, etc., to be used as part of the candidate site identification process according to the present disclosure.

Various embodiments of the presently disclosed system can integrate with current and future Air Traffic Management (ATM) systems. These embodiments can integrate with current voice and digital systems to announce intentions, declare emergencies, and transmit emergency routing, for example. Further, these embodiments can integrate with more advanced ATM systems that provide a service such as providing the nearby candidates landing sites and route and/or negotiating the sites and route to accommodate additional considerations such as nearby air traffic. Additional embodiments integrate with peer-to-peer based traffic management systems such as PSUs (Provider of Services to Urban Air Mobility) to directly negotiate sites and routes with nearby peer traffic, for example.

In addition to these embodiments, additional embodiments can be represented by various permutations of integrated/not-integrated, sensor/no-sensor, display/no-display, autonomous/non-autonomous, remote/local operator, and pre-flight/in-flight candidate site generation. Additional embodiments of the system include implementation for various aircraft types such as fixed-wing, rotorcraft, electric, VTOL, multicopter and various sizes from small (e.g., under fifty-five pounds) to large (e.g., cargo aircraft).

In various embodiments as described herein and shown in the drawings, the present disclosure provides a system for assessing aircraft landing sites that includes at least one sensor and a computing device, wherein the computing device is operable to identify one or more candidate landing sites for an in-flight aircraft, assess each of the one or more identified candidate landing sites for a total risk and determine a preferred route to a selected landing site or sites from the candidate landing sites based on the total risk assessment. In various embodiments, a notification or alert including the preferred route can be issued. The landing site(s) can be identified, assessed and/or selected from within a geographic map segment including the aircraft's location, for example. According to various embodiments, a suitability assessment of the selected landing site can be generated based on received updated data. The updated data can include current and/or real-time data associated with the selected landing site(s) as described elsewhere herein. Further, a notification that can include a recommended course of action can be issued based on the suitability assessment of the selected landing site.

The computing device can be a server or a system, for example, including a processor with a memory storing instructions for execution by the processor. The received data includes data from the sensor and can also include GIS data and airport data as described herein. The preferred route selection can be based on a quantification of the total risk, whereby, for example, the preferred route is selected based on the candidate landing site(s) having a low, lower or lowest total risk, or in other words, a high, higher or highest suitability assessment as described elsewhere herein.

In various embodiments, identifying and/or selecting a preferred route can involve selecting a route for continued flight, i.e., a route that is not associated with the one or more identified candidate landing sites. Such a selection may involve understanding the nature of the emergency of the in-flight aircraft, including available fuel, the level of emergency and availability of additional and likely more preferred candidate landing sites in a potentially more distant geographic area, for example. In such embodiments, the geographic map segment where the aircraft is currently located is updated as the aircraft moves, and new candidate landing sites are identified, assessed and considered for selection based on received data associated with the new location of the aircraft as it moves, effectively to a new geographic map segment.

In various embodiments, identifying and/or selecting a preferred route is performed so as to meet or exceed a perspective threshold for sensor data collection. A perspective threshold can be a minimum level of data quality and coverage expected to be obtained from a sensor. For example, if the preferred route affords sensors a line-of-sight view of the candidate landing site from multiple directions with no obstructions that occlude or block a sensor, which would lead to poor data collection from the sensor, it may meet the perspective threshold. As another example, a perspective threshold may be met or exceeded if multiple perspectives of the candidate landing site allow reconstruction of a 3D map.

It will be appreciated that various embodiments described herein include a device having a user interface adapted to display a map and a computing device, wherein the computing device is operable to identify, based on received data, one or more candidate landing sites for an aircraft, assess each of the identified candidate landing sites for a total risk, determine a preferred route to at least a first landing site based on the total risk, determine a suitability assessment for the first landing site based on updated data and update the user interface to display a recommended course of action as an overlay on the map. The received data can include data GIS data and airport data as described herein. The updated data can include data from one or more sensors, for example. The preferred route selection can be based on a quantification of the total risk, whereby, for example, the preferred route is selected based on the candidate landing site(s) having a low, lower or lowest total risk and/or a high, higher or highest suitability assessment. It will be appreciated that the received data and/or updated data can also be associated with a geographic map segment surrounding a location of the in-flight aircraft, such as the geographic map displayed as the two-dimensional map on the user interface, for example. The total risk for each of the one or more identified candidate landing sites can be quantified and determining the preferred route can involve selecting a route having a low, lower or lowest total risk and/or a high, higher or highest suitability assessment.

In certain embodiments in which the system includes a computing device, the computing device is any suitable computing device (such as a server) that includes at least one processor and at least one memory device or data storage device. As further described herein, the computing device includes at least one processor configured to transmit and receive data or signals representing events, messages, commands, or any other suitable information between the computing device and other devices. The processor of the computing device is configured to execute the events, messages, or commands represented by such data or signals in conjunction with the operation of the computing device as exemplified herein.

It will be appreciated that any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing, including a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

It will be appreciated that all of the disclosed methods, components and procedures herein can be implemented using one or more computer programs or components. These components may be provided as a series of computer instructions on any conventional computer-readable medium, including RAM, SATA DOM, or other storage media. The instructions may be configured to be executed by one or more processors which, when executing the series of computer instructions, performs or facilitates the performance of all or part of the disclosed methods and procedures.

Unless otherwise stated, devices or components of the present disclosure that are in communication with each other do not need to be in continuous communication with each other. Further, devices or components in communication with other devices or components can communicate directly or indirectly through one or more intermediate devices, components or other intermediaries. Further, descriptions of embodiments of the present disclosure herein wherein several devices and/or components are described as being in communication with one another does not imply that all such components are required, or that each of the disclosed components must communicate with every other component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed computers and computing devices, for example. In this regard, a processor (e.g., a microprocessor or controller device) receives instructions from a memory or like storage device that contains and/or stores the instructions, and the processor executes those instructions, thereby performing a process defined by those instructions. Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on a user's computer, partly on a user's computer, as a stand-alone software package, partly on a user's computer and partly on a remote computer or entirely on the remote computer or server.

Where databases are described in the present disclosure, it will be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art. Appropriate encryption and other security methodologies can also be employed by the system of the present disclosure, as will be understood to one of ordinary skill in the art.

Although the present approach has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present approach.

The invention claimed is:

1. A computer-implemented method for assessing aircraft landing sites, comprising:
    identifying, based on received data comprising at least one of GIS data and airport data, one or more candidate landing sites for an aircraft;
    assessing each of the one or more identified candidate landing sites for a total risk associated with each of the one or more identified candidate landing sites, wherein the total risk comprises an onboard risk and an on-ground risk;
    identifying a preferred route comprising a selected landing site from the one or more identified candidate landing sites;
    generating a suitability assessment of the selected landing site based on received updated data related to the selected landing site; and
    issuing a notification comprising a recommended course of action based on the suitability assessment of the selected landing site, wherein the notification comprises an update on a map displayed on a user interface, wherein the update comprises one or more preferred routes.

2. The computer-implemented method of claim 1, wherein the suitability assessment comprises a binary outcome that is above or below a pre-established suitability threshold.

3. The computer-implemented method of claim 1, wherein identifying a preferred route comprises selecting a route associated with the one or more identified candidate landing sites having a low, lower or lowest total risk.

4. The computer-implemented method of claim 1, wherein identifying a preferred route comprises selecting a route meeting or exceeding a perspective threshold for sensor data collection.

5. The computer-implemented method of claim 1, wherein the received data is associated with a geographic map segment surrounding a location of the aircraft, wherein the geographic map segment comprises a first geographic map segment and wherein the location comprises a first location, wherein the method further comprises:
    identifying, based on additional received data associated with a second geographic map segment surrounding a second location of the aircraft, one or more additional candidate landing sites for the aircraft;
    assessing each of the one or more additional identified candidate landing sites for a total risk associated with each of the one or more additional identified candidate landing sites;
    identifying an additional preferred route comprising at least one additional selected landing site of the one or more additional identified candidate landing sites.

6. The computer-implemented method of claim 1, wherein identifying a preferred route comprises receiving a selection from a pilot via a user interface.

7. The computer-implemented method of claim 1, wherein identifying a preferred route comprises receiving an automated selection based on the total risk.

8. The computer-implemented method of claim 1, wherein the total risk for a first candidate landing site of the one or more identified candidate landing sites comprises a determination of the cost and probability of occurrence of harm based upon a landcover, a terrain slope, and an obstruction height associated with the first candidate landing site.

9. The computer-implemented method of claim 1, wherein the recommended course of action comprises a display of the suitability assessment on a user interface comprising a map.

10. The computer-implemented method of claim 1, wherein each of the one or more candidate landing sites comprises a minimum landing footprint of the aircraft.

11. The computer-implemented method of claim 1, wherein the received data further comprises sensor data.

12. The computer-implemented method of claim 1, wherein the received data includes LIDAR data or an alternate source of 3D mapping data.

13. The computer-implemented method of claim 1, wherein the one or more candidate landing sites comprises a non-airport landing site.

14. The computer-implemented method of claim 1, wherein the one or more candidate landing sites comprises a non-airport landing site and an airport runway site.

15. A device, comprising:
    a user interface adapted to display a map; and
    a processor and a memory storing instructions which when executed, cause the processor to:
        identify, based on received data, one or more candidate landing sites for an aircraft, wherein the received data is associated with a geographic map segment surrounding a location of the aircraft;
        assess each of the one or more identified candidate landing sites for a total risk associated with each of the one or more identified candidate landing sites;
        determine a preferred route to at least a first landing site of the one or more identified candidate landing sites based on the total risk;
        determine a suitability assessment for the first landing site based on updated data associated with the first landing site; and
        update the user interface to display a recommended course of action as an overlay on the map, wherein the overlay comprises one or more preferred routes.

16. The device of claim 15, wherein the received data comprises GIS data, airport data and/or sensor data.

17. The device of claim 15, wherein the received data comprises GIS data and/or airport data, and where the updated data comprises sensor data and/or visually obtained data.

18. A system for assessing aircraft landing sites, comprising:
- at least one sensor;
- a processor and a memory storing instructions which when executed, cause the processor to:
  - identify, based on received data, one or more candidate landing sites for an aircraft;
  - assess each of the one or more identified candidate landing sites for a total risk associated with each of the one or more identified candidate landing sites, wherein the total risk comprises an onboard risk and an on-ground risk;
  - determine a suitability assessment for a first landing site of the one or more identified candidate landing sites based on updated data from the at least one sensor associated with the first landing site; and
  - issue a notification comprising a recommended course of action based on the suitability assessment for the first landing site, wherein the notification comprises an update on a map displayed on a user interface, wherein the update comprises routes with one or more relative risks and/or relative suitability assessments.

19. The system of claim 18, wherein the received data comprises GIS data and airport data.

20. The system of claim 18, wherein the instructions further cause the processor to determine a preferred route comprising one or more of the identified candidate landing sites having a low, lower or lowest total risk, and wherein the preferred route comprises the first landing site.

21. A computer-implemented method for assessing aircraft landing sites, comprising:
- identifying, based on received data comprising at least one of GIS data and airport data, one or more candidate landing sites for an aircraft;
- assessing each of the one or more identified candidate landing sites for a total risk associated with each of the one or more identified candidate landing sites;
- identifying a preferred route comprising a selected landing site from the one or more identified candidate landing sites;
- generating a suitability assessment of the selected landing site based on received updated data related to the selected landing site, wherein the suitability assessment comprises a binary outcome that is above or below a pre-established suitability threshold; and
- issuing a notification comprising a recommended course of action based on the suitability assessment of the selected landing site, wherein the notification comprises an update on a map displayed on a user interface, wherein the update comprises one or more preferred routes.

22. A computer-implemented method for assessing aircraft landing sites, comprising:
- identifying, based on received data comprising at least one of GIS data and airport data, one or more candidate landing sites for an aircraft;
- assessing each of the one or more identified candidate landing sites for a total risk associated with each of the one or more identified candidate landing sites;
- identifying a preferred route comprising a selected landing site from the one or more identified candidate landing sites, wherein identifying a preferred route comprises selecting a route meeting or exceeding a perspective threshold for sensor data collection;
- generating a suitability assessment of the selected landing site based on received updated data related to the selected landing site; and
- issuing a notification comprising a recommended course of action based on the suitability assessment of the selected landing site, wherein the notification comprises an update on a map displayed on a user interface, wherein the update comprises one or more preferred routes.

23. A computer-implemented method for assessing aircraft landing sites, comprising:
- identifying, based on received data comprising at least one of GIS data and airport data, one or more candidate landing sites for an aircraft, wherein the received data is associated with a geographic map segment surrounding a location of the aircraft, wherein the geographic map segment comprises a first geographic map segment and wherein the location comprises a first location;
- assessing each of the one or more identified candidate landing sites for a total risk associated with each of the one or more identified candidate landing sites;
- identifying a preferred route comprising a selected landing site from the one or more identified candidate landing sites;
- generating a suitability assessment of the selected landing site based on received updated data related to the selected landing site;
- issuing a notification comprising a recommended course of action based on the suitability assessment of the selected landing site, wherein the notification comprises an update on a map displayed on a user interface, wherein the update comprises one or more preferred routes;
- identifying, based on additional received data associated with a second geographic map segment surrounding a second location of the aircraft, one or more additional candidate landing sites for the aircraft;
- assessing each of the one or more additional identified candidate landing sites for a total risk associated with each of the one or more additional identified candidate landing sites; and
- identifying an additional preferred route comprising at least one additional selected landing site of the one or more additional identified candidate landing sites.

24. A computer-implemented method for assessing aircraft landing sites, comprising:
- identifying, based on received data comprising at least one of GIS data and airport data, one or more candidate landing sites for an aircraft;
- assessing each of the one or more identified candidate landing sites for a total risk associated with each of the one or more identified candidate landing sites;
- identifying a preferred route comprising a selected landing site from the one or more identified candidate landing sites, wherein identifying a preferred route comprises receiving an automated selection based on the total risk;
- generating a suitability assessment of the selected landing site based on received updated data related to the selected landing site; and
- issuing a notification comprising a recommended course of action based on the suitability assessment of the selected landing site, wherein the notification comprises an update on a map displayed on a user interface, wherein the update comprises one or more preferred routes.

\* \* \* \* \*

UNITED STATES PATENT AND TRADEMARK OFFICE
CERTIFICATE OF CORRECTION

PATENT NO. : 12,512,005 B1
APPLICATION NO. : 18/924294
DATED : December 30, 2025
INVENTOR(S) : Nathan Douglas Richards, Alec Jacob Devine Bateman and Loyd Hook It is certified that error appears in the above-identified patent and that said Letters Patent is hereby corrected as shown below:

On the Title Page

Item (72) Inventors
The second inventors name currently reads "Alec JacobDevine Bateman, Charlottesville, VA(US);"
It should read: --Alec Jacob Devine Bateman, Charlottesville, VA(US);--

Signed and Sealed this
Tenth Day of February, 2026

John A. Squires
*Director of the United States Patent and Trademark Office*